Figure 1:
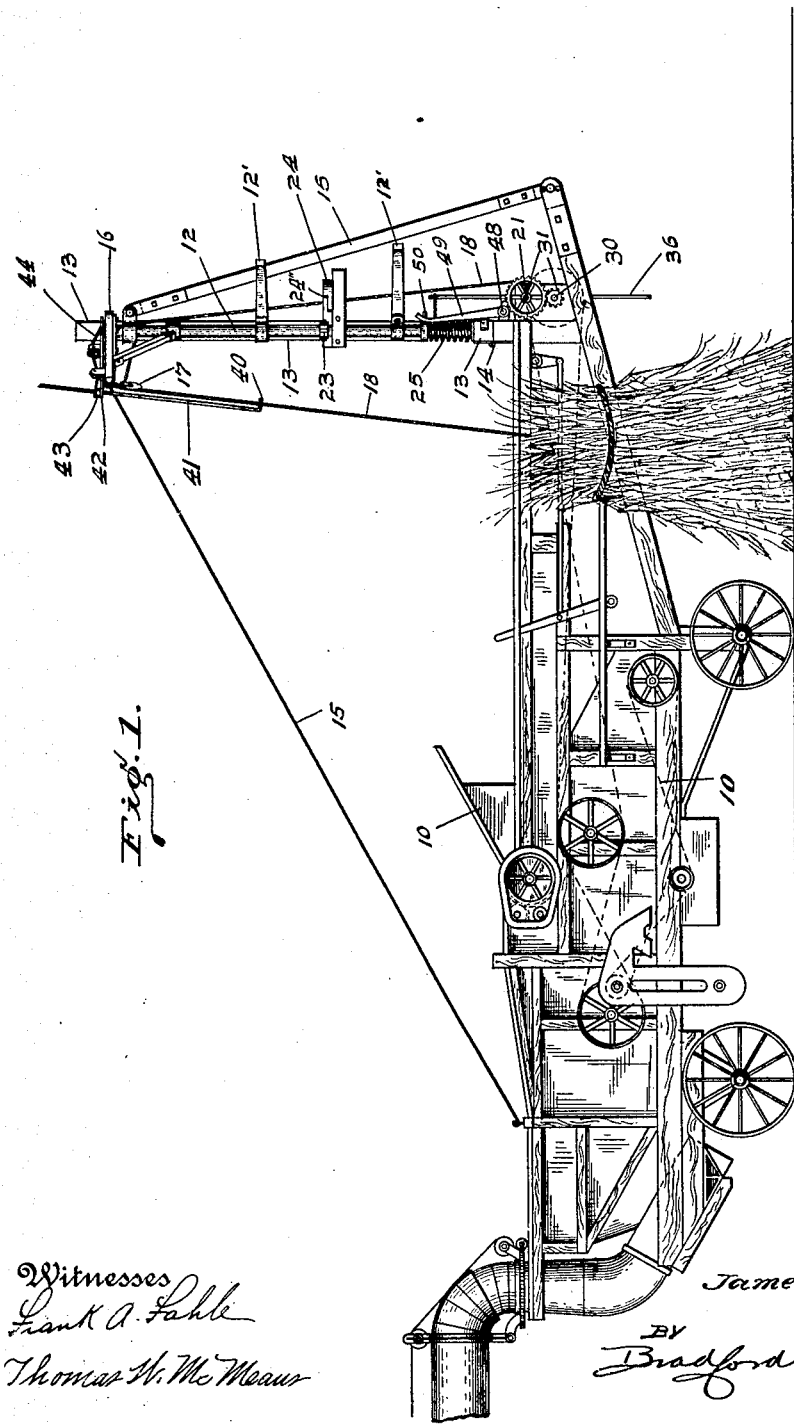

J. B. SCHUMAN.
CROP HANDLING MACHINE.
APPLICATION FILED MAY 22, 1906.

913,438.

Patented Feb. 23, 1909.
3 SHEETS—SHEET 1.

Witnesses
Frank A. Fahle
Thomas W. McMeans

Inventor
James B. Schuman
BY Bradford Hood
Attorneys

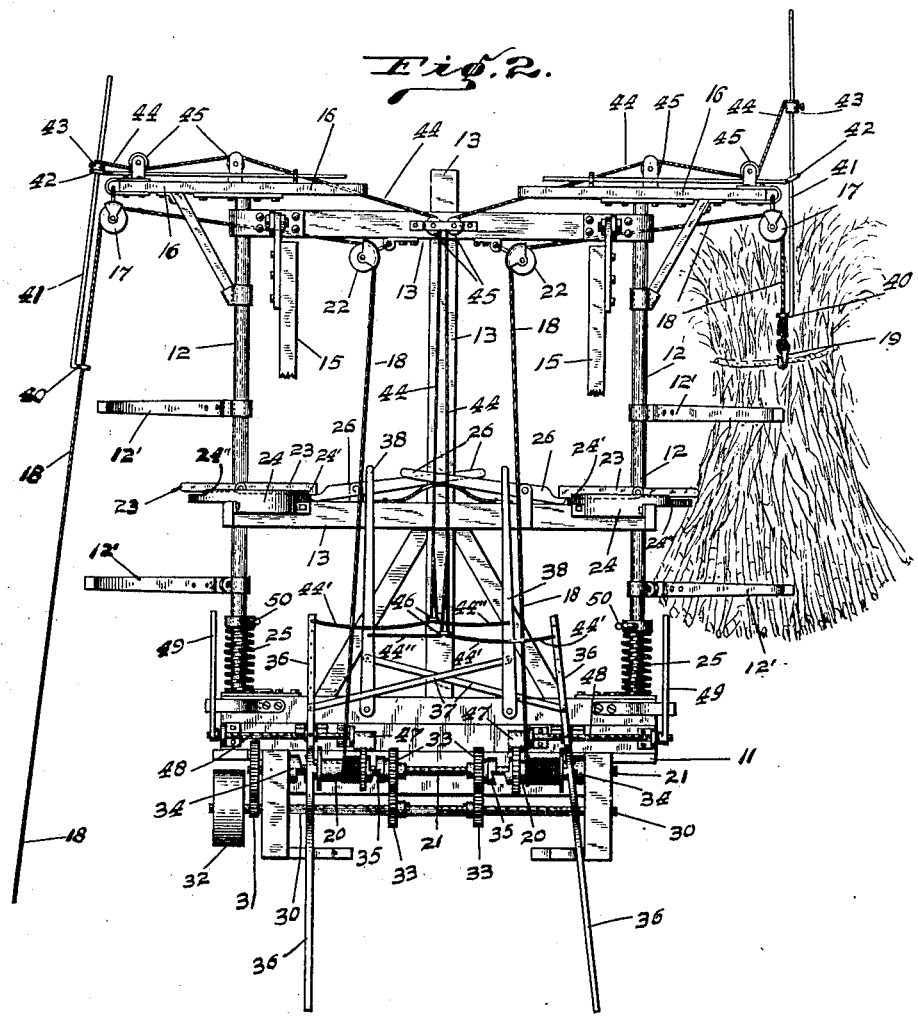

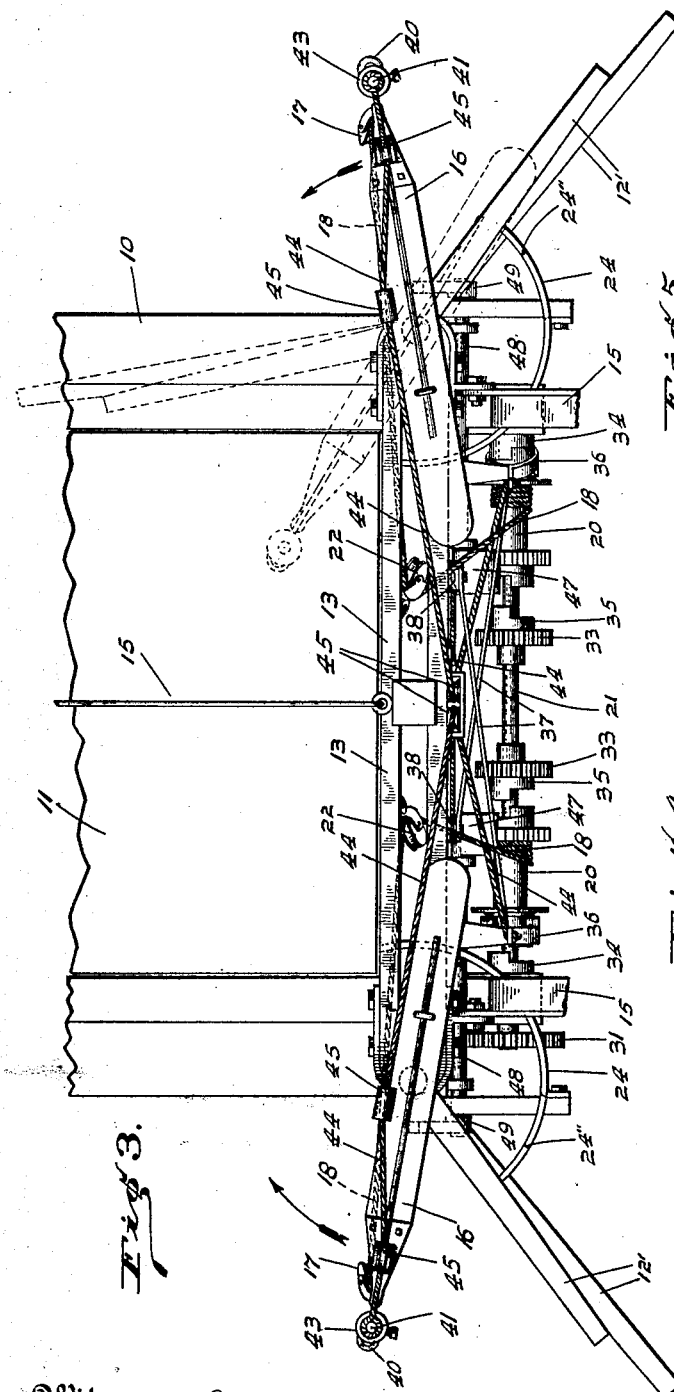

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

CROP-HANDLING MACHINE.

No. 913,438.      Specification of Letters Patent.      Patented Feb. 23, 1909.

Application filed May 22, 1906. Serial No. 318,164.

*To all whom it may concern:*

Be it known that I, JAMES B. SCHUMAN, a citizen of the United States, residing at Indianapolis, in the county of Marion and State of Indiana, have invented certain new and useful Improvements in Crop-Handling Machines, of which the following is a specification.

The object of my invention is to produce an apparatus capable of association with a crop-treating machine, such, for instance, as a corn shredder, for lifting the crop in bundles onto a platform adjacent the receiving end of the crop-treating machine, the construction and arrangement being such that the mechanism may be readily operated to handle the crop and deliver it to the feeding platform as needed.

The accompanying drawings illustrate my invention:

Figure 1 is a side elevation of a corn shredder equipped with my improved handling mechanism; Fig. 2 is an end elevation of the handling mechanism; Fig. 3 a plan thereof on a scale somewhat larger than the scale of Figs. 1 and 2; Fig. 4 a detail on a larger scale of the retaining and releasing means for one of the masts, and Fig. 5 a plan of the parts shown in Fig. 4.

In the drawings, 10 indicates a crop-treating machine of any desired kind, and 11 indicates a feeding platform arranged in convenient position to hold the crop to be treated adjacent the receiving end of the crop-treating machine. In the drawings, the platform 11 is shown as constructed integrally with the frame of the machine 10, but it is to be understood of course that it may be separately mounted and provided with means for temporary attachment in operative position, without departing from my invention. Arranged at each rear corner of the platform 11 is a mast 12 which is journaled, so as to rock on a vertical axis, in a suitable supporting framework 13, said frame being preferably hinged at 14 to the rear end of platform 11 so that it may be folded down for transportation, the frame 13 being rigidly held in operative position by suitable braces 15. Each mast 12 carries a plurality of radially projecting arms 12' which serve to engage the lifted shock and force the same around with the mast when it is turned. Each mast also carries at its upper end a cross arm 16, at the outer end of each of which is a pulley 17 over which runs a lifting cable 18. Each lifting cable 18 is provided with a suitable hook or other means 19 to engage a shock or bundle of the crop to be treated, while the inner end of each cable is carried to one of a pair of winding drums 20 which drums are mounted loosely upon a shaft 21 journaled in suitable bearings at the rear of the platform 11. Each cable 18, in passing from its pulley 17 to its drum 20, is passed over a pulley or guide 22 attached to the upper end of the frame 13 forward of the normal position of the arm 16 so that, when a pull is exerted upon one of the cables 18 it will tend to swing the corresponding mast 12 in the direction indicated by the arrow in Fig. 3 so as to bring the same to the position indicated in dotted lines at the right of Fig. 3. Each mast 12 is normally retained in extended position, against a pull exerted upon its lifting cable 18, by means of a detent 23 which extends radially from the mast and is pivoted thereon, said detent being arranged to lie behind a shoulder 24' formed on a segment 24 supported by the frame 13. The detent 23 is also adapted to lie in front of a shoulder 24" also formed on the segment 24. The normal position of each mast is that shown in full lines in the several figures, the arm 16 being extended outward from the side of the machine, and in order to insure this normal position I provide for each mast 12 a spring 25 which normally urges the shaft to the desired position so that the detent 23 thereof will lie behind the shoulder 24'. When in this position the outer end of each detent lies immediately above one end of a releasing lever 26 which is mounted upon the frame 13. Shaft 21 is arranged to be driven at a slow speed by a shaft 30 geared thereto by a suitable train of gearing 31, the shaft 30 being provided with a belt pulley 32 which may be connected to any proper pulley carried by the machine 10.

Where the bundled crop is light it is desirable to lift the same at a high speed and I therefore provide for each drum 20 a suitable train of gears 33, the final one of each of which is loose upon shaft 21. Shaft 21 is provided adjacent one end of each drum 20 with a clutch 34 with which the adjacent drum may be caused to engage and the final gear of each train 33 is provided with a clutch 35 adapted to be engaged by a clutch member carried by the adjacent end of the adjacent drum 20. Each drum 20 is therefore arranged to be moved longitudinally upon a shaft 21 into engagement with either of the clutches 34 or 35, and in order to do this I provide for each drum a shifting lever 36, the lower end of which is extended downward so as to be within convenient reach from the ground. Attached to the upper end of each lever 36 is a link 37, the opposite end of which is attached to a lever 38 which is extended upward into convenient reach of an operator on the platform 11. It is desirable that each drum 20 be automatically withdrawn from driving engagement with its driving train whenever a bundle of crop has been sufficiently lifted, and in order to accomplish this I pass the outer end of each lifting cable through an eye 40 carried by a rod 41, which rod passes through a suitable guide 42 carried at the outer end of each arm 16. Secured to rod 41, preferably by an adjustable collar 43, above guide 42 is a rope 44 which passes from thence under and over suitable guides 45 downward along frame 13 and through a guide 46. At its lower end each rope 44 is bifurcated, and one member 44' thereof is extended to the upper end of one of the levers 36, while the other member 44'' is extended in the opposite direction to the lever 38 of the opposite set, the two members 44' and 44'' being so proportioned in length that one will be loose when the other is tight. A suitable detent 47 is arranged to engage ratchet teeth formed in the rim of one flange of each drum 20 so that reverse or unwinding rotation of each drum 20 may be prevented except when desired. Each detent 47 is carried by a rock-shaft 48 which may be manipulated by a lever 49 extended up to a point where it will be engaged by a finger 50 carried by mast 12, the detent 47 being thus automatically withdrawn when the shock is swung around over the receiving platform.

The operation is as follows: With the parts in the position indicated in full lines in Fig. 3 one or both of the cables 18 may be extended to any desired point and caused to engage a bundle or shock of crop to be treated. The operator will then shift the corresponding lever 38 so as to bring the proper drum 20 into driving engagement with one or the other of its sets of driving gears, whereupon the cable 18 will be wound upon its drum and the shock will be lifted. When the shock approaches the position indicated at the right in Fig. 2, the lower end of rod 41 will be engaged and the rod lifted, as indicated at the right in Fig. 2, thus exerting a pull upon the corresponding rope 44 and, through its bifurcated ends, acting upon whichever lever 36 or 38 has been used to shift the drum into driving position, to return said drum to its middle or non-driving position, the arrangement being such that when the two ends of the rope 44 are taut, the drum corresponding thereto will be in its middle position. The lifted shock will remain in this position until it is desired on the platform 11. When this time comes the operator will manipulate the proper lever 26, or the detent 23 to withdraw said detent from behind shoulder 24', whereupon the pull of the cable 18 will cause the lifted bundle to be swung around towards the middle line of the apparatus. As the mast and bundle swing to this position the finger 50 hits lever 49 and withdraws pawl 47 from drum 20, and consequently the lifted bundle drops upon the platform 11 in desired position, this movement releasing the tension upon the corresponding rope 44. When the mast swings to depositing position its detent will automatically drop in front of the adjacent shoulder 24'', thus retaining the mast in its abnormal position. As soon as the bundle is released the operator will withdraw the corresponding detent from in front of the shoulder 44'' which it engages and the spring 25 of the mast in use will serve to automatically return the mast to extended and lifting position.

I have found in the actual use of this apparatus that shocks of corn may be drawn to the machine from points one hundred and fifty feet or more distant and quickly and automatically lifted to and deposited upon the feeding platform 11. When the crop is preferably deposited in an upright position upon the platform 11 it may be conveniently fed to the machine by operators standing on the platform.

I claim as my invention:

1. In a crop treating machine, the combination, with a receiving platform arranged adjacent the receiving end of the treating machine, of a pair of lifting mechanisms arranged each at one side of said receiving platform and each comprising a support for a lifting cable, means by which said support may be shifted from a point beyond the receiving platform to a point above the receiving platform, and a cable passing over said support, winding drums for said cables, driving means for said drums, two shifting mechanisms one arranged at each side of the receiving platform, and intermediate connections between each of said shifting means and the winding drum driving mechanism whereby either of said winding drum driving means may be rendered operative or inoperative from either side of the receiving platform.

2. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

3. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

4. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, yielding means for normally urging the mast to lifting position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

5. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, yielding means for normally urging the mast to lifting position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

6. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

7. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

8. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, yielding means for normally urging the mast to lifting position, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

9. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, yielding means for normally urging the mast to lifting position, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, and means for temporarily preventing reverse rotation of the drum.

10. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

11. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

12. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, yielding means for normally urging the mast to lifting position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

13. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, yielding means for normally urging the mast to lifting position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

14. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

15. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

16. In a crop treating machine, the combination, with a receiving platform arranged in feeding position adjacent the receiving end of said crop treating machine, of a mast rotatably mounted thereon and provided with a cross arm, means for holding said mast with its cross arm extended in lifting position, lifting mechanism carried by said cross arm, yielding means for normally urging the mast to lifting position, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

17. In a crop treating machine, the combination, with a receiving platform arranged in feeding position adjacent the receiving end of said crop treating machine, of a derrick mast rotatably mounted thereon, and provided with a cross arm, lifting mechanism consisting in part of a cable passing through a support near the outer end of said arm and through a support on the main frame eccentric to the axis of the mast whereby a pull upon said cable will tend to swing the mast to bring the outer end of its cross arm over the receiving platform, means for temporarily holding the mast against such rotation, yielding means for normally urging the mast to lifting position, means for temporarily holding the mast in delivery position, a drive shaft, a winding drum sleeved upon said shaft and axially movable thereon, a clutch carried by said shaft, interengaging clutch members carried by the adjacent end of the drum, a driving member sleeved on the shaft adjacent the opposite end of the drum, interengaging clutch members on said driving member and the adjacent end of the drum, means for shifting said drum into engagement with either of said clutches, means for temporarily preventing reverse rotation of the drum, and means associated with the lifting cable for shifting said drum to non-driving position.

In witness whereof, I have hereunto set my hand and seal at Indianapolis, Indiana, this 9th day of May, A. D. one thousand nine hundred and six.

JAMES B. SCHUMAN. [L. S.]

Witnesses:
THOMAS W. MCMEANS,
ARTHUR M. HOOD.